United States Patent
Hengst et al.

(10) Patent No.: US 7,330,310 B2
(45) Date of Patent: Feb. 12, 2008

(54) FOCUSING DEVICE WITH DIOPTER ADJUSTMENT

(75) Inventors: Alfred Hengst, Lahnau (DE); Rolf Speier, Wettenberg (DE)

(73) Assignee: Leica Camera AG, Solms (DE)

( * ) Notice: Subject to any disclaimer, the term of this patent is extended or adjusted under 35 U.S.C. 154(b) by 119 days.

(21) Appl. No.: 11/131,219

(22) Filed: May 18, 2005

(65) Prior Publication Data

US 2005/0259321 A1 Nov. 24, 2005

(30) Foreign Application Priority Data

May 21, 2004 (DE) .................... 10 2004 024 964

(51) Int. Cl.
 *G02B 23/00* (2006.01)
(52) U.S. Cl. ........................................ 359/418
(58) Field of Classification Search ........... 359/410, 359/414, 416, 417, 418
 See application file for complete search history.

(56) References Cited

U.S. PATENT DOCUMENTS

| | | | |
|---|---|---|---|
| 2,602,371 A | 7/1952 | Harford | |
| 3,918,792 A | 11/1975 | Beecher | |
| 4,162,820 A * | 7/1979 | Schwab et al. | 359/414 |
| 4,329,013 A | 5/1982 | Hengst | |
| 4,630,901 A | 12/1986 | Altenheiner et al. | |
| 4,818,086 A * | 4/1989 | Moore | 359/414 |
| 4,989,963 A | 2/1991 | Farnung et al. | |
| 5,064,279 A * | 11/1991 | Riedl | 359/416 |
| 5,212,591 A * | 5/1993 | Funathu | 359/407 |
| 6,266,185 B1 | 7/2001 | Miller et al. | |

FOREIGN PATENT DOCUMENTS

| | | |
|---|---|---|
| DE | 364 747 | 12/1922 |
| DE | 1 749 772 | 8/1957 |
| DE | 29 20 583 C2 | 12/1980 |
| DE | 38 30 620 C2 | 4/1984 |
| DE | 84 04 136 U1 | 5/1984 |
| EP | 0 416 346 B1 | 3/1991 |
| EP | 0 961 147 B2 | 12/1999 |

\* cited by examiner

*Primary Examiner*—Alessandro Amari
(74) *Attorney, Agent, or Firm*—Foley & Lardner LLP

(57) ABSTRACT

A method for focusing and diopter adjustment in a binocular telescope, in which, for the purpose of diopter adjustment, optical focusing elements (12) in the two telescope tubes (2, 3) can be displaced relative to one another, is distinguished by the fact that, as a result of rotation of a focus drive knob (5), both focusing elements (12) are displaced simultaneously by equal distances via a focus drive, the displacement of at least one of the focusing elements (12) can be locked (13, 14), and, as a result of rotation of the focus drive knob (5), while overcoming a frictional force in the focus drive to the locked focusing element (12), only the unlocked focusing element (12) is displaced.

9 Claims, 3 Drawing Sheets

FOCUSING DEVICE WITH DIOPTER ADJUSTMENT

The invention relates to a method and a device for carrying out the method for focusing and diopter adjustment in a binocular telescope, in which, for the purpose of diopter adjustment, optical focusing elements in the two telescope tubes can be displaced relative to one another.

DE 29 20 583 C2 discloses a binocular telescope with internal focusing. The two telescope tubes are mounted on a bridge such that they can be pivoted. Mounted on the bridge is a focus drive knob which, via a focusing drive, is coupled to the optical focusing elements mounted such that they can be displaced in the telescope tubes. For the purpose of diopter adjustment, one of the focusing elements is additionally mounted such that it can be rotated, the focus drive at the coupling point being guided in a spiral groove in the mount of the focusing element. As a result of rotation of this focusing element, an axial relative adjustment with respect to the other focusing element is therefore carried out.

EP 0 416 346 B1 discloses a binocular telescope in which a focus drive knob and a diopter adjustment drive knob are arranged on opposite sides of the bridge. Via a focus drive acting on two separate actuating means, the two optical focusing elements are displaced simultaneously by the same distances. The diopter adjustment drive knob is connected to one actuating means via a coupling shaft and via a thread to the other actuating means. Via the coupling shaft, one focusing element can be displaced relative to the other focusing element. The functional assignment of the two drive knobs cannot readily be seen, so that inadvertent maladjustments cannot be ruled out.

A further known solution according to DE 38 30 620 C2 consists in forming the focus drive knob with a double function, in which two latching positions for the focusing and diopter adjustment are provided. During a diopter adjustment, after the first tube has been set, the binoculars must be put down and the drive knob changed over or uncoupled. The test object must be looked for again and its bearing must be found again. Finally, the drive knob must be moved into the initial position again.

All the known solutions having internal focusing and diopter compensation require reaching around separate adjusting devices for the focusing and the diopter adjustment. The operating elements of the diopter adjustment are frequently located at ergonomically unfavorable points, which means that unsteadiness is produced in the image during the adjustment. Often, the target is lost from sight and has to be looked for again.

The invention was therefore based on the object of providing a method and a device for simple and logical individual focus compensation (diopter adjustment) in binocular observation instruments having central focusing. The adjusting mechanism should make it possible, using one and the same ergonomically favorably placed operating knob, to be able to perform the range setting and the diopter adjustment without changeover operations.

According to the invention, this object is achieved by the defining features of the method specified in claim 1.

The basic idea of the method according to the invention is that, during the diopter adjustment with the drive knob, first of all a tube is set sharply on a test object. By means of subsequently pressing on a locking button with the second hand, this setting is fixed, while then, using the same drive knob, after overcoming a frictional force, the second tube is set sharply. After the locking button has been released, the telescope is set individually to the two eyes of the user and the drive knob is merely used over the entire distance range for focusing on an object to be observed.

Two devices for carrying out the method according to the invention emerge from the defining features of claims 2 and 5. Advantageous developments and refinements of the devices are specified in the subclaims.

Exemplary embodiments of the invention are illustrated schematically in the drawing and will be described in more detail by using the figures, in which.

Figure 1:
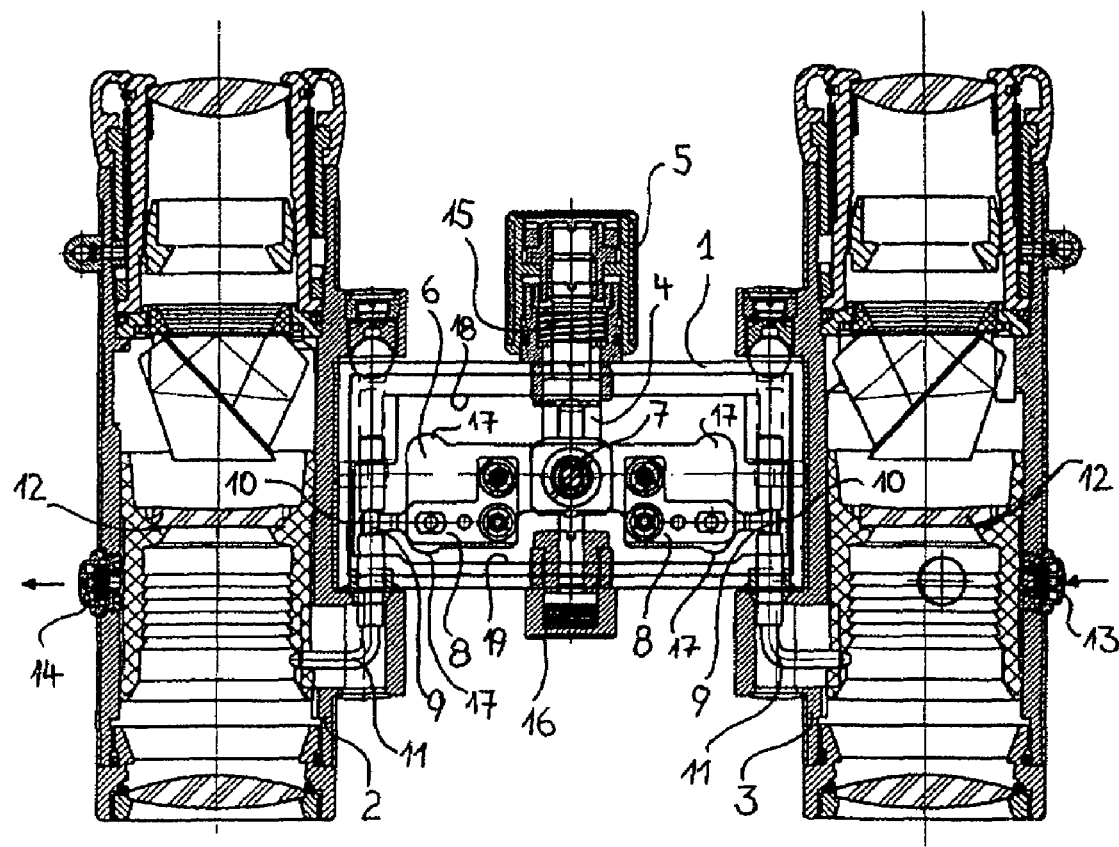
FIG. 1 shows a first exemplary embodiment with friction on the pivotable lever.

FIG. 1 shows a binocular telescope having a bridge 1, on which the two telescope tubes 2, 3 can be pivoted with respect to each other via two joints. Mounted in the center of the bridge 1 is a spindle 4 that can be displaced longitudinally. At the upper end, the spindle 4 has an external thread, which engages in an internal thread of a focus drive knob 5 mounted on the bridge 1 such that it can rotate. Of course, the internal and external threads can also be interchanged with respect to the two parts. As a result of rotation of the focus drive knob 5, an axial movement of the spindle 4 is effected.

On the lower part of the spindle 4, located in the bridge 1, a two-armed lever 6 arranged transversely with respect to the spindle 4 is mounted such that it can be pivoted in such a way that it can be moved with a specific torque. The pivoting bearing 7 is equipped with a specific frictional force by means of spring clamping and friction elements not illustrated here.

On the two sides of the lever 6, coupling levers 8 that can be pivoted relative to the lever 6 are fitted, which are used for adjusting the optics in the two telescope tubes 2, 3. The coupling levers 8 engage with a spherically shaped end 9 in annular incisions 10 of rods 11 mounted in the joint axis of the telescope tubes 2, 3. The rods 11 engage via an angled attachment in the mounts of the focusing elements 12 which can be displaced longitudinally in the telescope tubes 2, 3. As a result of rotation of the focus drive knob 5, the two focusing elements 12 are therefore simultaneously displaced axially.

Pushbuttons 13, 14 are fitted on the two telescope tubes 2, 3 in a position which is easy to grip. The pushbutton 13 illustrated and pressed in the direction of the arrow has the effect of locking the focusing element 12 in the telescope tube 3 by means of pressure on the mount.

The locking force, on the one hand, and the frictional force in the pivoting bearing 7, on the other hand, are matched to each other in such a way that, when the pushbutton 13, 14 on one of the telescope tubes 2, 3 is actuated and, at the same time, the focus drive knob 5 is rotated, the two-armed lever 6 is pivoted in its pivoting bearing 7 on the spindle 4 and, in the process, displaces only the focusing element 12 in the respective other tube. After the pressed-in pushbutton has been released, the frictional force in the pivoting bearing 7 keeps the two-armed lever 6 in its position pivoted with respect to the spindle 4, and therefore likewise keeps the focusing elements 12 in a position displaced relative to each other. When the focus drive knob 5 is rotated, the focusing elements 12 are displaced simultaneously, while maintaining the mutual relative position.

For the purpose of drive-side and opposite limitation of the actuating travel of the spindle 4, prestressed spring packs 15, 16 are provided in the bearings of the spindle 4. The actuating travel between the spring packs 15, 16 is designed such that unimpeded movement of the spindle 4 is possible even when the lever 6 is pivoted to the maximum within the bridge 1.

By means of somewhat more powerful onward rotation of the focus drive knob 5 in the two end positions of the spindle 4, counter to the pressure of the respective spring pack 15, 16, a slight additional movement of the spindle 4 can be carried out.

Stop studs 17 are in each case integrally molded on the lever 6, at the end of the two arms in the direction of the actuating movements. The bridge 1 contains stop surfaces 18, 19 on the drive side and opposite thereto. The stop studs 17 and stop surfaces 18, 19 are matched to one another such that, when the lever 6 is set obliquely, one of the stop studs 17 comes into contact with one of the stop surfaces 18, 19 only when the spindle 4 is displaced further counter to the pressure of one of the spring packs 15, 16. The possible further actuating travel of the spindle 4, counter to the pressure of the spring pack 15, 16, is dimensioned such that in each case the stop studs 17 of the two arms on the same side of the lever 6 can come into contact with the respective stop surfaces 18, 19 in the bridge 1. In the process, the lever 6 is rotated back, counter to the frictional force in the pivoting bearing 7, into its initial position orthogonal with respect to the spindle 4. This action of resetting to the same visual acuity in the two telescope tubes 2, 3 can thus be carried out in the same way in the end focusing positions for infinitely distant and very close observation.

Figure 2:
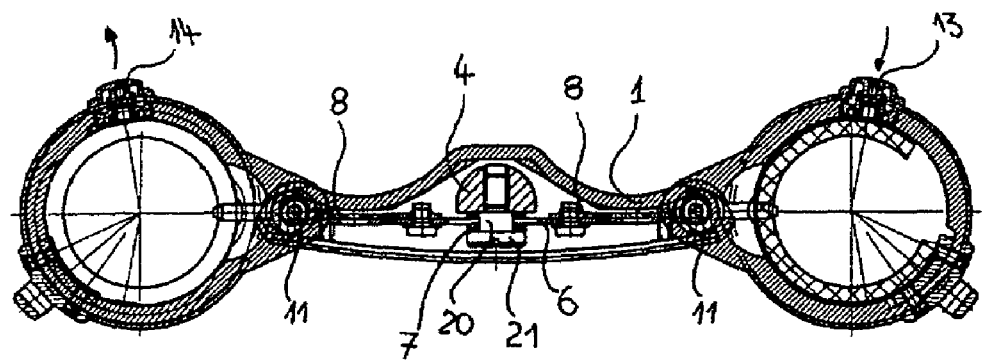
FIG. 2 shows a cross section of the pivoting bearing with friction.

FIG. 2 shows the pivoting bearing 7 in cross section through the bridge 1. The two-armed lever 7 is mounted such that it can pivot on the pin 20 of a screw 21 which is screwed into the spindle 4. Between the screw head and the support on the spindle 4, suitable frictional and/or spring elements are inserted on the pin 20 and, as a result of tightening and fixing the screw 21, produce the desired frictional force in the pivoting bearing 7.

The abovedescribed functioning of the focusing device permits the following operating sequence for focusing and diopter adjustment. Using the focus drive knob 5, one of the telescope tubes 2, 3 is set sharply on a test object. If both telescope tubes 2, 3 are equipped with a possible locking means for the displacement of one of the focusing elements 12, it is immaterial which of the telescope tubes 2, 3 is set sharply first. The focus is fixed by pressing and holding on the set tube while, by means of further rotation on the focus drive knob 5, the respective other tube is set sharply on the test object. After the pushbutton 13, 14 has been released, the two tubes are set to the different visual acuities of the eyes of the operator. The focusing on other objects at a different distance is then carried out as usual by merely rotating the focus drive knob 5. In order to reset the diopter adjustment, the spindle 4 merely needs to be moved further, counter to the pressure of one of the spring packs 15, 16, by using the focus drive knob 5.

Because of the simple and rapid adjustment of the individual sharpness and the likewise simple and rapid possibility of resetting to the same visual acuity for both telescope tubes, a separate diopter indication via a special diopter scale can be dispensed with. Operation appears less complicated to the user. He needs only to concentrate on the usual rotation of one knob for setting the focus and briefly pressing a knob in order to hold the focus in one tube.

Figure 3:
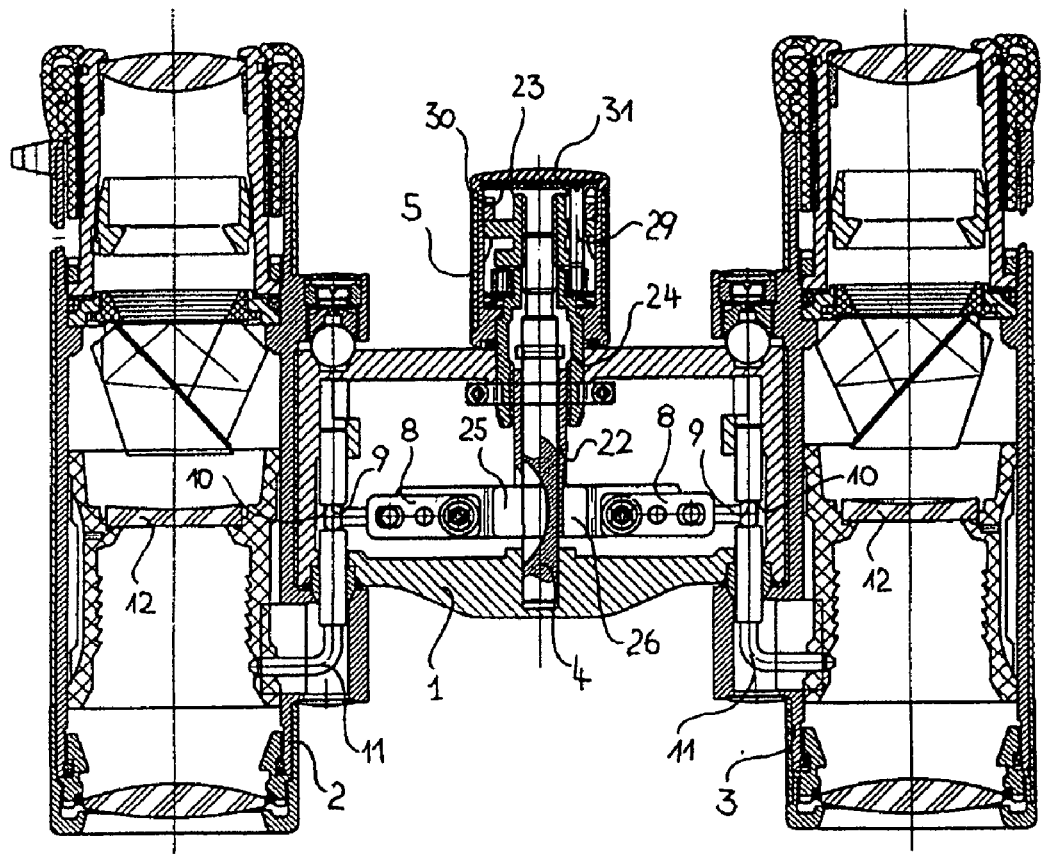
FIG. 3 shows a second exemplary embodiment with friction in the focus drive.

FIG. 3 shows a further exemplary embodiment, in which a longitudinally displaceable axial tube 22 is arranged coaxially on a longitudinally adjustable spindle 4. A focus drive knob 5 is mounted at the upper end of the bridge 1 such that it can rotate. Arranged in said drive knob 5, one behind the other, are two threaded nuts 23, 24 with different thread diameters. The upper threaded nut 23 having the smaller thread is connected by a form fit to the focus drive knob 5. A spindle 4 mounted oppositely at the bottom of the bridge 1 engages with its external thread in the threaded nut 23. The lower, larger threaded nut 24 is mounted in the bridge 1 such that it can rotate and is connected by a force fit having a specific frictional force to the focus drive knob 5. An external thread fitted to the axial tube 22 engages in the thread of this nut 24.

A lever arm 25 pointing toward the telescope tube 2 is fitted to the spindle 4, and a lever arm 26 pointing toward the telescope tube 3 is fitted to the axial tube 22. Once more, coupling levers 8 having spherical end pieces 9 are fitted to both lever arms 25, 26 and are used for coordinating the optics in the telescope tubes 2, 3. As in the first exemplary embodiment, the spherical end pieces 9 engage in annular incisions 10 in rods 11 for displacing the focusing elements 12. When the focus drive knob 5 is rotated, both threaded nuts 23, 24 connected to it are also rotated. These simultaneously move the focusing elements 12 in the two telescope tubes 2, 3 via the spindle 4 and the axial tube 22, in conjunction with the gear trains which follow in each case.

Figure 4:
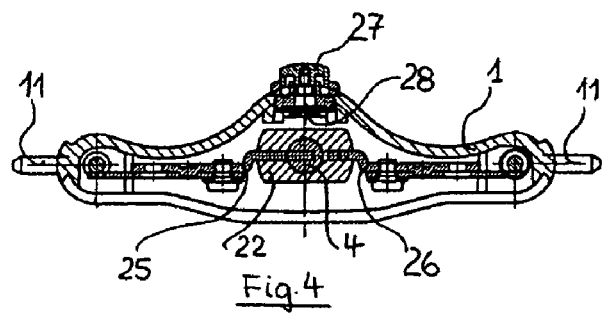
FIG. 4 shows a cross section through the focus drive with spindle and axial tube.

A spring-back pushbutton 27 on the rear side of the bridge 1 is illustrated in FIG. 4. By using this, a locking pin 28 projecting axially into the bridge 1 can be pushed into the bridge. The lower end of the threaded nut 24 located in the bridge 1 is designed such that, in conjunction with the locking pin 28 of the pushbutton 27, force-fitting or form-fitting locking of the rotational movement of the lower threaded nut 24 can be carried out. Instead of the locking pin 28, in particular a cylindrical pressure jaw which engages around a cylindrical attachment on the threaded nut 24 can also be provided on the pushbutton 27.

When the pushbutton 27 is pressed in during the rotation of the focus drive knob 5, only the upper, upper threaded nut 23 firmly connected to it will corotate. The frictional force between the focus drive knob 5 and the lower threaded nut 24 will be overcome, so that a relative rotational movement with respect to the lower threaded nut 24 takes place. In this case, during the rotation of the focus drive knob 5, focusing occurs only in the telescope tube 2.

Fitted to the upper circular surface of the focus drive knob 5 is a diopter indicator, which indicates the focusing adjustment of the two telescope tubes 2, 3 in relation to each other. By means of a transmission pin 29 there is coupling between a diopter disk 30 and the lower threaded nut 24. The index mark related to the diopter disk 30 is applied to a transparent disk 31 firmly connected to the focus drive knob 5.

In the case of this exemplary embodiment, the operating sequence for focusing and diopter adjustment must be carried out as follows. First of all, the telescope tube 3 is set sharply on a test object by using the focus drive knob 5. By means of pressing and holding the pushbutton 27 on the bridge 1, the sharpness of this telescope tube 3 is fixed, while the telescope tube 2 is then set sharply on the test object by using the focus drive knob 5. After the pushbutton 27 has been released, both focusing elements 12 are again displaced simultaneously for focusing while maintaining their mutual relative positions.

To preset a known diopter value for different eyes, the pushbutton 27 is pressed in and, by means of rotation of the focus drive knob 5, the desired diopter value is set by means of coordinating the diopter disk 30 with the index marking 31.

Figure 5:
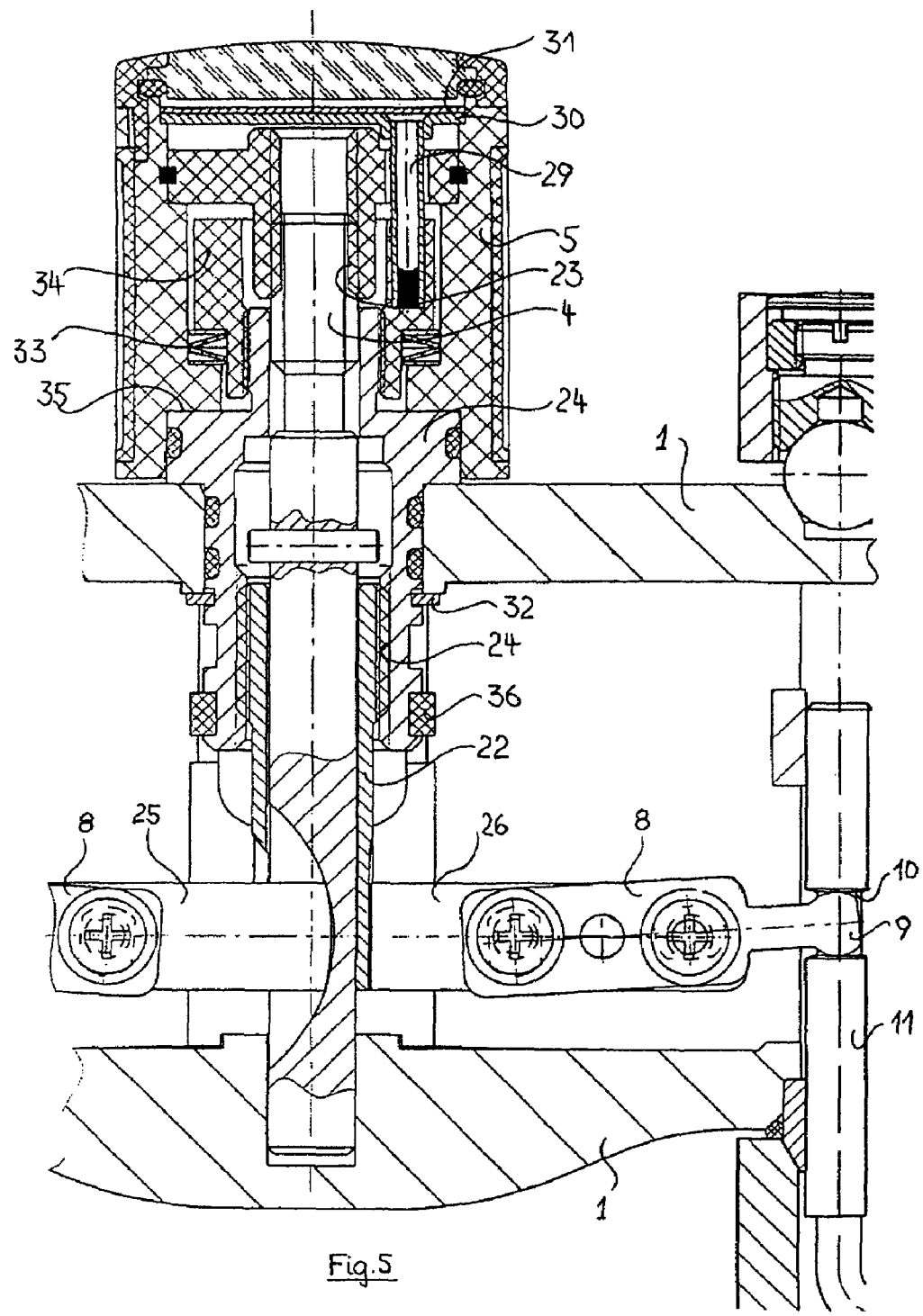
FIG. 5 shows a cross section through the focus drive knob and the focus drive.

FIG. 5 shows the focus drive knob 5 and the focus drive of the second exemplary embodiment in detail. The lower threaded nut 24 has been inserted into the bridge 1 and is held within the bridge 1 by a circlip 32 such that it can rotate. In order to seal the rotary seat, O rings, not designated, are provided. The focus drive knob 5 is placed upon the threaded nut 24 under the stress of a spring 33. The spring stress is generated by a union nut 34, which is screwed to the threaded nut 24. The spring stress is adjusted such that the desired frictional force is achieved in the seating face 35 of the focus drive knob 5 on the threaded nut 24. Friction disks, not illustrated, can additionally be inserted into the seating face 35.

In the configuration of the seat and the clamping of the focus drive knob 5 on the threaded nut 24, and in the rotational mounting of the threaded nut 24 in the bridge 1, care must be taken that no tilting moments can arise in the event of pressure on the focus drive knob 5 transversely with respect to its axis of rotation.

The alignment of the coupling levers 8 on the lever arms 25, 26 has the effect of adjusting the rod 11 and therefore the driven focusing element 12. The coordination can be performed, for example, when focusing at infinity and without diopter adjustment.

Fitted to the part of the lower threaded nut 24 located in the bridge 1 is a friction ring 36 which, in interaction with the locking pin 28, not illustrated here, ensures fixed locking of the diopter adjustment via the displacement of the spindle 4. Of course, the converse arrangement is also possible, in which the friction lining is fitted to the locking part to be pressed in.

LIST OF DESIGNATIONS

1 Bridge
2, 3 Telescope tubes
4 Spindle
5 Focus drive knob
6 Two-armed lever
7 Pivoting bearing
8 Coupling lever
9 Spherical end on coupling lever
10 Annular incision
11 Rods
12 Focusing elements
13, 14 Pushbutton
15, 16 Prestressed spring pack
17 Stop studs
18, 19 Stop surfaces
20 Pin
21 Screw
22 Axial tube
23 Upper threaded nut
24 Lower threaded nut
25, 26 Lever arms
27 Pushbutton
28 Locking pin
29 Transmission pin
30 Diopter disk
31 Index-mark disk
32 Circlip
33 Spring
34 Union nut
35 Seating face
36 Friction ring

The invention claimed is:

1. A focusing device, comprising a bridge, to which two telescope tubes are fixed, and a focus drive knob which is mounted on the bridge and has a focus drive, which is coupled to focusing elements mounted within the telescope tubes such that they can be displaced, wherein:
   the focus drive contains a longitudinally displaceable spindle and a two-armed lever located transversely with respect to the spindle,
   the lever is mounted directly on the spindle such that it can be pivoted by overcoming a frictional force and its lever arms are coupled to the focusing elements, and
   a lock that can be actuated from the outside and acts on the associated focusing element is provided on at least one of the telescope tubes.

2. The device as claimed in claim 1, wherein an actuating movement of the spindle in the bridge is limited on both sides by a prestressed spring pack.

3. The device as claimed in claim 2, wherein, in each case in the direction of the actuating movement, the two lever arms have stop studs which, after a prestress of the respective spring pack has been overcome, can be brought into contact with stop surfaces in the bridge which are orthogonal with respect to the actuating movement of the spindle.

4. The device as claimed in claim 1, wherein the lock provided is a spring-mounted pushbutton.

5. A focusing device, comprising a bridge, to which two telescope tubes are fixed, and a focus drive knob which is mounted on the bridge and has a focus drive, which is coupled to focusing elements mounted in the telescope tubes such that they can be displaced, wherein:
   the focus drive contains a longitudinally displaceable spindle and an axial tube arranged coaxially on the latter,
   the axial tube is coupled to the spindle such that it can be displaced longitudinally in such a way that the coupling can be released after a frictional force has been overcome,
   lever arms respectively projecting sideways are fixed to the spindle and the axial tube and are coupled to one of the focusing elements, and
   a locking means that can be actuated from outside and acts on the axial tube is provided on the bridge.

6. The device as claimed in claim 5, wherein the spindle is connected to the focus drive knob by an upper threaded nut which is firmly connected to the focus drive knob, wherein the axial tube is connected to a lower threaded nut which is mounted on the spindle and in the bridge such that it can rotate, and the focus drive knob is mounted on the lower threaded nut such that it can be rotated with a predetermined frictional force.

7. The device as claimed in claim 6, wherein a diopter disk that is mounted such that it can be rotated with respect to a fixed index mark is mounted in the head of the focus drive knob and is connected to a transmission pin inserted into the lower threaded nut.

8. The device as claimed in claim 5, wherein coupling levers are arranged which are mounted on the lever arms such that they can be pivoted and, following adjustment of an identical focusing position of the focusing elements in the two telescope tubes, can be fixed.

9. The device as claimed in claim 5, wherein the locking means provided is a spring-mounted pushbutton.

* * * * *